US009143684B2

(12) United States Patent
Choi et al.

(10) Patent No.: US 9,143,684 B2
(45) Date of Patent: Sep. 22, 2015

(54) DIGITAL PHOTOGRAPHING APPARATUS, METHOD OF CONTROLLING THE SAME, AND COMPUTER-READABLE STORAGE MEDIUM

(75) Inventors: Myung-kyu Choi, Suwon-si (KR); Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 779 days.

(21) Appl. No.: 13/023,621

(22) Filed: Feb. 9, 2011

(65) Prior Publication Data

US 2011/0279649 A1 Nov. 17, 2011

(30) Foreign Application Priority Data

May 12, 2010 (KR) ........................ 10-2010-0044618

(51) Int. Cl.
| | |
|---|---|
| H04N 5/228 | (2006.01) |
| H04N 13/02 | (2006.01) |
| H04N 5/232 | (2006.01) |

(52) U.S. Cl.
CPC ........... *H04N 5/23248* (2013.01); *H04N 5/228* (2013.01); *H04N 5/2327* (2013.01); *H04N 13/02* (2013.01); *H04N 13/0239* (2013.01)

(58) Field of Classification Search
CPC ............................... H04N 5/228; H04N 13/02
USPC .......................................................... 348/46
See application file for complete search history.

(56) References Cited

U.S. PATENT DOCUMENTS

| | | | | |
|---|---|---|---|---|
| 5,258,799 | A * | 11/1993 | Tanii et al. ...................... | 396/60 |
| 5,625,408 | A | 4/1997 | Matsugu et al. | |
| 5,801,760 | A * | 9/1998 | Uomori ........................... | 348/47 |
| 5,850,576 | A * | 12/1998 | Matsuzawa ..................... | 396/55 |
| 5,864,360 | A * | 1/1999 | Okauchi et al. ................. | 348/47 |
| 6,067,420 | A * | 5/2000 | Hara et al. ...................... | 396/55 |
| 6,570,566 | B1 * | 5/2003 | Yoshigahara ................. | 345/427 |
| 6,637,883 | B1 * | 10/2003 | Tengshe et al. ............... | 351/210 |
| 6,760,063 | B1 * | 7/2004 | Kamei ........................ | 348/211.8 |
| 7,324,134 | B2 * | 1/2008 | Sato et al. .................... | 348/208.2 |
| 7,586,534 | B2 * | 9/2009 | Suto et al. ................... | 348/333.09 |
| 7,593,040 | B2 * | 9/2009 | Shan et al. ................... | 348/208.99 |
| 8,139,109 | B2 * | 3/2012 | Schmiedel et al. ........... | 348/118 |
| 8,212,860 | B2 * | 7/2012 | Numako ........................ | 348/61 |
| 8,243,123 | B1 * | 8/2012 | Geshwind et al. ............. | 348/42 |
| 8,330,824 | B2 * | 12/2012 | Hashi et al. ................. | 348/208.5 |
| 8,345,085 | B2 * | 1/2013 | Sawachi .......................... | 348/46 |
| 8,619,148 | B1 * | 12/2013 | Watts et al. ................. | 348/218.1 |
| 2001/0014171 | A1 * | 8/2001 | Iijima et al. ................... | 382/154 |
| 2003/0160886 | A1 * | 8/2003 | Misawa et al. ................ | 348/347 |
| 2003/0235411 | A1 * | 12/2003 | Morikawa et al. ............ | 396/281 |
| 2005/0128323 | A1 * | 6/2005 | Choi ............................ | 348/239 |
| 2005/0200712 | A1 * | 9/2005 | Uenaka ..................... | 348/208.99 |

(Continued)

FOREIGN PATENT DOCUMENTS

| | | |
|---|---|---|
| KR | 1020040018859 A | 3/2004 |
| KR | 1020080047901 A | 5/2008 |

*Primary Examiner* — Richard Torrente
*Assistant Examiner* — Irfan Habib
(74) *Attorney, Agent, or Firm* — Drinker Biddle & Reath LLP

(57) ABSTRACT

An apparatus, computer readable medium, and a method of controlling a digital photographing apparatus comprising a plurality of optical systems, the method including deriving shake information from the plurality of optical systems; and determining a base optical system from among the plurality of optical systems according to the shake information.

22 Claims, 6 Drawing Sheets

(56) References Cited

U.S. PATENT DOCUMENTS

| | | | |
|---|---|---|---|
| 2005/0220359 A1* | 10/2005 | Sun et al. | 382/274 |
| 2006/0050158 A1* | 3/2006 | Irie | 348/246 |
| 2007/0147813 A1* | 6/2007 | Washisu | 396/53 |
| 2007/0291130 A1* | 12/2007 | Broggi et al. | 348/218.1 |
| 2008/0037970 A1* | 2/2008 | Saito et al. | 396/55 |
| 2009/0052052 A1* | 2/2009 | Yamano | 359/690 |
| 2009/0052883 A1* | 2/2009 | Lee et al. | 396/263 |
| 2009/0066829 A1* | 3/2009 | Iwasaki | 348/340 |
| 2009/0086174 A1* | 4/2009 | Fukumoto et al. | 355/29 |
| 2009/0096887 A1* | 4/2009 | Tamaoki | 348/222.1 |
| 2009/0116123 A1* | 5/2009 | Hashi et al. | 359/704 |
| 2009/0231445 A1* | 9/2009 | Kanehiro | 348/208.2 |
| 2009/0262184 A1* | 10/2009 | Engle et al. | 348/47 |
| 2010/0053346 A1* | 3/2010 | Mitsunaga | 348/208.6 |
| 2010/0053349 A1* | 3/2010 | Watanabe et al. | 348/222.1 |
| 2010/0158490 A1* | 6/2010 | Pfeiffer et al. | 396/16 |
| 2010/0188484 A1* | 7/2010 | Park et al. | 348/46 |
| 2010/0194958 A1* | 8/2010 | Honda et al. | 348/311 |
| 2010/0220398 A1* | 9/2010 | Ohtake | 359/683 |
| 2010/0265317 A1* | 10/2010 | Tomizawa et al. | 348/46 |
| 2011/0007133 A1* | 1/2011 | Imanishi | 348/42 |
| 2011/0038622 A1* | 2/2011 | Tanaka | 396/55 |
| 2011/0043646 A1* | 2/2011 | Watanabe et al. | 348/208.4 |
| 2011/0063461 A1* | 3/2011 | Masuda | 348/208.11 |
| 2011/0141228 A1* | 6/2011 | Shimada | 348/36 |
| 2011/0149096 A1* | 6/2011 | Matsuyama | 348/208.6 |
| 2011/0169918 A1* | 7/2011 | Yoo | 348/46 |
| 2011/0169921 A1* | 7/2011 | Lee et al. | 348/46 |
| 2012/0038793 A1* | 2/2012 | Shimizu et al. | 348/231.99 |
| 2012/0143430 A1* | 6/2012 | Broggi et al. | 701/28 |
| 2012/0281119 A1* | 11/2012 | Ohba et al. | 348/240.2 |
| 2013/0057754 A1* | 3/2013 | Shimada et al. | 348/362 |

* cited by examiner

BASE OPTICAL SYSTEM
SHORT-TIME EXPOSED IMAGE

REFERENCE IMAGE OPTICAL SYSTEM
LONG-TIME EXPOSED IMAGE

RESULT IMAGE

BASE OPTICAL SYSTEM
LONG-TIME EXPOSED IMAGE

REFERENCE IMAGE OPTICAL SYSTEM
SHORT-TIME EXPOSED IMAGE

RESULT IMAGE

BASE OPTICAL SYSTEM
+2EV

REFERENCE IMAGE OPTICAL SYSTEM
-2EV

RESULT IMAGE

DIGITAL PHOTOGRAPHING APPARATUS, METHOD OF CONTROLLING THE SAME, AND COMPUTER-READABLE STORAGE MEDIUM

CROSS-REFERENCE TO RELATED PATENT APPLICATION

This application claims the benefit of Korean Patent Application No. 10-2010-0044618, filed on May 12, 2010, in the Korean Intellectual Property Office, the entire disclosure of which is incorporated herein by reference.

BACKGROUND

1. Field of the Invention

The invention relates to a digital photographing apparatus, a method of controlling the same, and a computer-readable storage medium for storing a computer program that controls the digital photographing apparatus.

2. Description of the Related Art

Digital photographing apparatuses convert an optical signal that has passed through an optical system including lens, iris, etc., into an electrical signal in an image pickup device to photograph a subject. The optical system focuses the incident light from the subject on to the image pickup device and controls the amount of light and depth of the captured image of the subject.

Users of digital photographing apparatuses often evaluate the quality of digital photographing apparatuses based on the quality of the images captured.

SUMMARY

Therefore there is a need in the art for a digital photographing apparatus that includes a plurality of optical systems and obtains an image having a high picture quality by effectively determining a base optical system.

A method of controlling a digital photographing apparatus comprising a plurality of optical systems, the method including deriving shake information from the plurality of optical systems; and determining a base optical system from among the plurality of optical systems according to the shake information.

The step of determining a base optical system may include determining that an optical system least shaken from among the plurality of optical systems is the base optical system.

The step of deriving shake information further may include detecting a grip position, and the step of determining a base optical system further comprises determining that an optical system closest to the grip position is the base optical system.

The steps of deriving shake information and the step of determining a base optical system may be performed before capturing an image.

The step of deriving shake information may include calculating point spread functions (PSFs) from a plurality of images captured via the plurality of optical systems, and the step of determining a base optical system further comprises determining a base optical system from among the plurality of optical systems according to the shake information based on the calculated PSFs.

The method may include detecting a user's input for selecting a base optical system determination type, wherein if the user's input indicates a prior determination type, the steps of deriving the shake information and determining the base optical system are performed before capturing an image, and the step of deriving of the shake information further comprises detecting the grip position, and the step of determining of the base optical system further comprises determining that an optical system closest to the grip position is the base optical system, wherein if the user's input indicates a post determination type, the steps of deriving of the shake information and the determining of the base optical system are performed after capturing an image, and the step of deriving of the shaking information further comprises calculating PSFs from the plurality of images captured via the plurality of optical systems, and the step of determining of the base optical system further comprises determining that an optical system least shaken from among the plurality of optical systems is the base optical system based on the calculated PSFs.

The method of controlling the digital photographing apparatus may include if a plurality of images comprises at least one short-time exposed image and at least one long-time exposed image and if the derived shake information indicates the digital photographing apparatus is affected by handshake, controlling capturing of at least one short-time exposed image in the base optical system.

The method of controlling the digital photographing apparatus may include if a plurality of images comprises at least one short-time exposed image and at least one long-time exposed image and if the derived shake information indicates the digital photographing apparatus is not affected by handshake, controlling capturing of at least one long-time exposed image in the base optical system.

The method of controlling the digital photographing apparatus may include if the plurality of images comprises at least one image having a small exposure value and at least one image having a large exposure value, and if a plurality of images for correcting backlight are captured through the plurality of optical systems, controlling capturing of at least one image having a large exposure value in the base optical system.

The method of controlling the digital photographing apparatus may include if at least one wide angle image and at least one telescopic image are captured through the plurality of optical systems, controlling capturing of the at least one telescopic image in the base optical system.

The method of controlling the digital photographing apparatus may include if a plurality of images for obtaining a three-dimensional image are captured through the plurality of optical systems, controlling capturing of an image having a short exposure time in the base optical system.

The method of controlling the digital photographing apparatus may include if a plurality of images for obtaining a three-dimensional image are captured through the plurality of optical systems, controlling capturing of an image having a large amount of input data in the base optical system.

The method may include selecting an image captured in the base optical system as a result image.

A digital photographing apparatus is disclosed. The digital photographing apparatus may include a plurality of optical systems; at least one image pickup device configured to convert light that has passed through the plurality of optical systems into an electrical signal; a shake information deriving unit configured to derive shake information from the plurality of optical systems; and a base optical system determining unit configured to determine a base optical system from among the plurality of optical systems according to the shake information.

The base optical system determining unit may be configured to determine that an optical system least shaken from among the plurality of optical systems is the base optical system.

The shake information deriving unit may include a grip position detector configured to detect a grip position, and the base optical system determining unit may include a prior determining unit configured to determine that an optical system closest to the grip position is the base optical system.

The grip position detector may further be configured to detect the grip position before capturing an image, and the prior determining unit may further be configured to determine the base optical system before capturing an image.

The shake information deriving unit may further be configured to derive shake information based on a PSF calculator configured to calculate PSFs from the plurality of images captured via the plurality of optical systems, and the base optical system determining unit may further be configured to determine based on the shake information that an optical system less shaken from among the plurality of optical systems is the base optical system.

The digital photographing apparatus may include a user input detector configured to detect a user's input for selecting a base optical system determination type; a grip position detector configured to detect a grip position before capturing an image; a PSF calculator configured to calculate a PSFs from a plurality of images captured via the plurality of optical systems, wherein the shake information deriving unit is further configured to derive shake information based on the calculated PSF's; a prior determining unit configured to determine that an optical system closest to the detected grip position is the base optical system before capturing an image if the user's input indicates a prior determination type; and a post determining unit configured to determine that an optical system least shaken based on the derived shake information from among the plurality of optical systems is the base optical system if the user's input indicates a post determination type.

The digital photographing apparatus may include a photographing controller configured to capture at least one short-time exposed image in the base optical system if a plurality of images captured through the plurality of optical systems comprises at least one short-time exposed image and at least one long-time exposed image, and if the shake information indicates the digital photographing apparatus is affected by hand-shake.

The digital photographing apparatus may include a photographing controller configured to control a capturing of at least one long-time exposed image if a plurality of images captured through the plurality of optical systems are for correcting shaking, and if the plurality of images comprises at least one short-time exposed image and at least one long-time exposed image, and if the digital photographing apparatus is not affected by hand-shake.

The digital photographing apparatus may include a photographing controller configured to control capturing of at least one image having a large exposure value in the base optical system, if a plurality of images captured through the plurality of optical systems are images for correcting backlight, and if the plurality of images comprises at least one image having a small exposure value and at least one image having a large exposure value.

The digital photographing apparatus further may include a photographing controller configured to control capturing of at least one telescopic image in the base optical system, if at least one wide angle image and at least one telescopic image are captured through the plurality of optical systems.

The digital photographing apparatus may include a photographing controller configured to control capturing of an image having a short exposure time in the base optical system if a plurality of images for obtaining a three-dimensional image are captured through the plurality of optical systems.

The digital photographing apparatus may include a photographing controller configured to control capturing of an image having a large amount of input data in the base optical system if a plurality of images for obtaining a three-dimensional image are captured through the plurality of optical systems.

The digital photographing apparatus may include a result image obtaining unit configured to select an image captured in the base optical system as a result image.

A computer-readable storage medium is disclosed. The computer-readable storage medium may have embodied thereon a computer program for controlling a digital photographing apparatus comprising a plurality of optical systems, the computer program may include a code portion for causing a computer to derive shake information from the plurality of optical systems; and a code portion for causing the computer to determine a base optical system from among the plurality of optical systems according to the shaking information.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION

Embodiments of the invention will now be described more fully with reference to the accompanying drawings, in which exemplary embodiments of the invention are shown. The following description and the accompanying drawings are for understanding the operations of the invention, and a portion that can easily be understood to those skilled in the art will be omitted.

Moreover, the specification and the accompanying drawings are not provided for the purpose of limitation, and the spirit and scope of the invention should be defined by the appended claims. In the specification, terms should be interpreted as meanings and concepts suitable for the spirit and scope of the invention in order to most appropriately express the invention.

Hereinafter, embodiments of the invention will be described with reference to the accompanying drawings.

Figure 1:
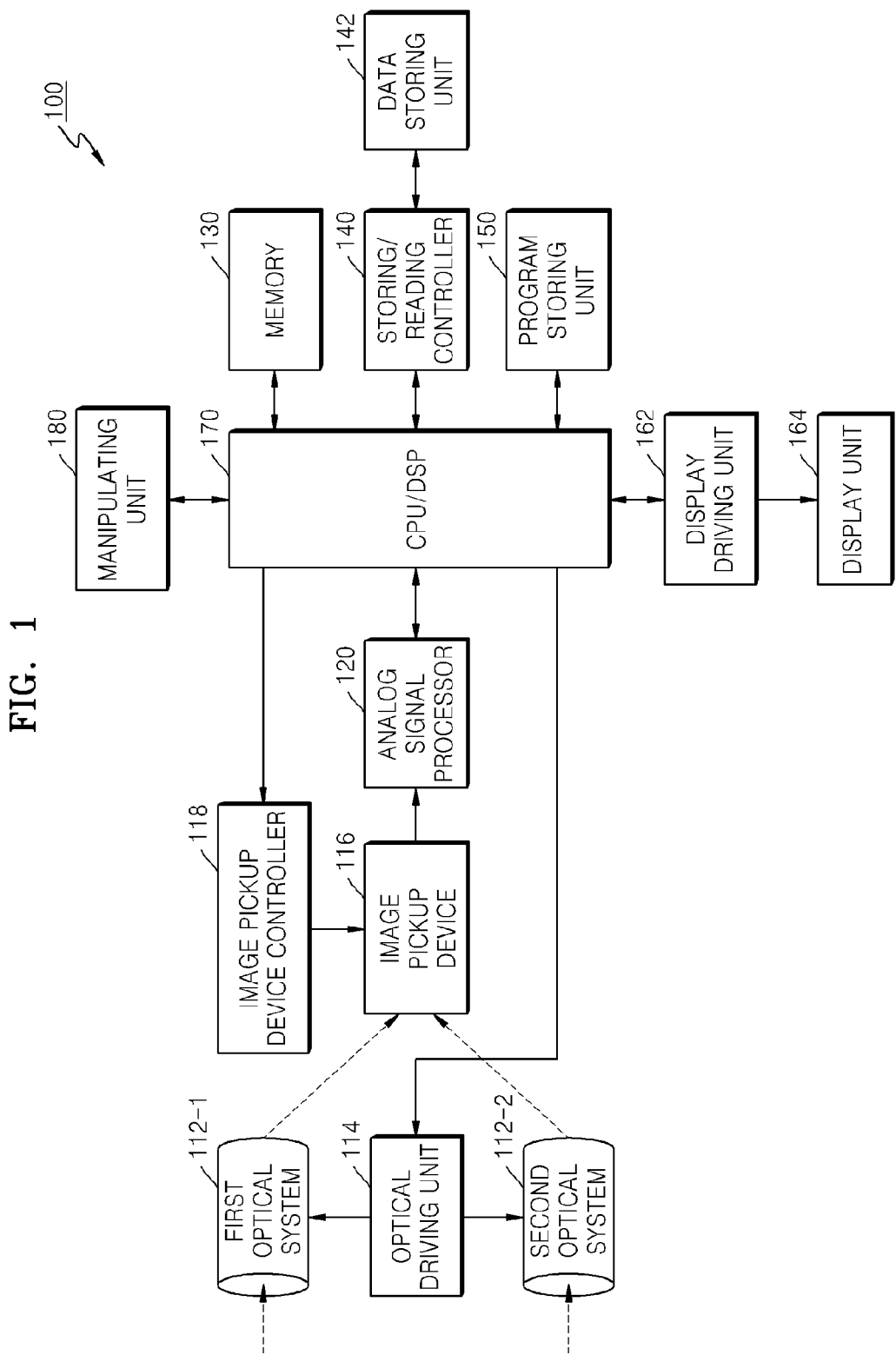
FIG. 1 is a schematic block diagram illustrating a digital photographing apparatus, according to an embodiment of the invention.

FIG. 1 is a schematic block diagram illustrating a digital photographing apparatus 100, according to an embodiment of the invention.

The digital photographing apparatus 100 includes at least two optical systems that may receive an optical signal from the same direction. In the current embodiment of the invention, the digital photographing apparatus 100 including two optical systems is used, but the invention is not limited thereto. Thus, any of various other digital photographing apparatuses including more optical systems may be used.

The digital photographing apparatus 100 includes a first optical system 112-1, a second optical system 112-2, an optical driving unit 114, an image pickup device 116, an image pickup device controller 118, an analog signal processor 120, a memory 130, a storing/reading controller 140, a data storing unit 142, a program storing unit 150, a display driving unit 162, a display unit 164, a central processing unit/digital signal processor (CPU/DSP) 170, and a manipulating unit 180.

The overall operation of the digital photographing apparatus 100 is controlled by the CPU/DSP 170. The CPU/DSP 170 applies control signals to the optical driving unit 114, the image pickup device controller 118, etc, to operate each component of the digital photographing apparatus 100.

Figure 2:
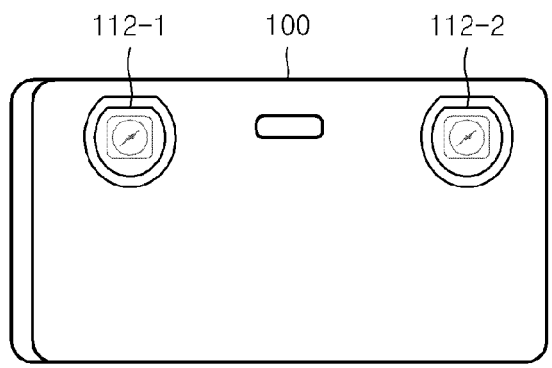
FIG. 2 illustrates a digital photographing apparatus, according to an embodiment of the invention.

The first and second optical systems 112-1 and 112-2 focus an optical signal that is input from a subject on a light receiving surface of the image pickup device 116. The first and second optical systems 112-1 and 112-2 may each further include an iris (not shown), a zoom lens (not shown), a focus lens (not shown), a mirror (not shown), a prism (not shown), etc. Configurations of the first and second optical systems 112-1 and 112-2 may be the same or different. As illustrated in FIG. 2, the first and second optical systems 112-1 and 112-2 are disposed in such a way as to receive an optical signal from the same direction. The first and second optical systems 112-1 and 112-2, as illustrated in FIG. 2, may be disposed so that optical axes thereof are arranged parallel to each other at a predetermined interval from each other.

The optical driving unit 114 drives the first and second optical systems 112-1 and 112-2. The optical driving unit 114 may control an opening extent of the iris included in each of the first and second optical systems 112-1 and 112-2 and may control positions of the zoom lens, the focus lens, etc. The optical driving unit 114 may drive the first and second optical systems 112-1 and 112-2 according to a control signal applied from the CPU/DSP 170. Although only a single optical driving unit 114 drives both the first and second optical systems 112-1 and 112-2 in FIG. 1, two optical driving units for respectively driving the first and second optical systems 112-1 and 112-2 may also be provided.

An optical signal that has passed through the first and second optical systems 112-1 and 112-2 is formed as an image of a subject on the light receiving surface of the image pickup device 116. The image pickup device 116 may be a charge coupled device (CCD) image sensor or a complementary metal oxide semiconductor image sensor (CIS) for converting an optical signal into an electrical signal. The image pickup device controller 118 may control sensitivity of the image pickup device 116. The image pickup device controller 118 may control the image pickup device 116 according to a control signal that is automatically generated by an image signal that is input in real time or according to a control signal that is manually input due to a user's manipulation.

As illustrated in FIG. 1, when an optical signal that has passed through the first and second optical systems 112-1 and 112-2 is captured using one image pickup device 116, the path of the optical signal is controlled to be focused on the image pickup device 116 by using the mirror and/or the prism included in each of the first and second optical systems 112-1 and 112-2. Also, an optical signal that is input from the first optical system 112-1 and an optical signal that is input from the second optical system 112-2 are successively captured by the image pickup device 116, thereby capturing first and second images.

Alternatively, a first image pickup device for capturing an optical signal that has passed through the first optical system 112-1 and a second image pickup device for capturing an optical signal that has passed through the second optical system 112-2 may be separately provided. In this case, the first and second images may be captured at the same time.

An exposure time of the image pickup device 116 may be controlled by a shutter (not shown). The shutter may include a mechanical shutter that controls light incidence by moving a cover or an electronic shutter that controls light exposure by applying an electrical signal to the image pickup device 116.

The analog signal processor 120 performs various processes, such as noise reduction, gain adjustment, waveform shaping, analog-digital conversion, etc., with respect to an analog signal input by the image pickup device 116.

The signal processed by the analog signal processor 120 may be input to the CPU/DSP 170 via the memory 130 or in a way bypassing the memory 130. The memory 130 operates as a main memory of the digital photographing apparatus 100 and temporarily stores information required when operating the CPU/DSP 170. The program storing unit 150 stores a program such as an operating system or an application system for driving the digital photographing apparatus 100.

In addition, the digital photographing apparatus 100 includes the display unit 164 for displaying an operation state of the digital photographing apparatus 100 and information of an image captured by the digital photographing apparatus 100. The display unit 164 may provide visual information and/or auditory information to a user. The display unit 164 may be a liquid crystal display (LCD) panel or an organic light-emitting display (OLED) panel in order to provide visual information to a user. Alternatively, the display unit 164 may be a touch screen that may recognize a touch input.

The display driving unit 162 applies a driving signal to the display unit 164.

The CPU/DSP 170 processes an image signal input thereto and controls each component of the digital photographing apparatus 100 according to the image signal or an external input signal. The CPU/DSP 170 may reduce noise in the image data and perform image signal processes for improving the picture quality, for example, gamma correction, color filter array interpolation, color matrix, color correction, color enhancement, etc. Also, the CPU/DSP 170 may compress the image data that is generated by performing the image signal processes for improving the picture quality to generate an image file or may restore image data from an image file. A compression format of an image may be a reversible type or an irreversible type. For example, when an image is a still image, the image may be converted into a joint photographic experts group (JPEG) format or a JPEG 2000 format. Also, when a video is recorded, a video file may be generated by compressing a plurality of frames according to a moving picture experts group (MPEG) standard.

Image data that is output from the CPU/DSP 170 is input to the storing/reading controller 140 directly or via the memory 130. The storing/reading controller 140 stores the image data in the data storing unit 142 automatically or according to a signal that is input by a user. The storing/reading controller 140 may read data regarding an image from an image file stored in the data storing unit 142 and input the data to the display driving unit 162 via the memory 130 or via a different path, thereby displaying an image on the display unit 164. The data storing unit 142 may be detachable from or permanently attachable to the digital photographing apparatus 100.

The CPU/DSP 170 may also perform various processes, for example, indistinctness treatment, coloring, blurring, edge emphasizing, image interpretation, image recognition, image effect treatment, etc. The image recognition may include face recognition and scene recognition. In addition, the CPU/DSP 170 may perform signal processing on an image to be displayed on the display unit 164. For example, the CPU/DSP 170 may perform various processes, for example, brightness level adjustment, color interpolation, contrast adjustment, outline emphasis adjustment, screen division, character image formation, image composition, etc. The CPU/DSP 170, which is connected to an external monitor, may perform signal processing on a predetermined image to be displayed on the external monitor. The CPU/DSP 170 may transmit the processed image data to the external monitor in order to display the corresponding image on the external monitor.

In addition, the CPU/DSP 170 may execute a program stored in the program storing unit 150. The CPU/DSP 170 may include an additional module to generate a control signal for controlling auto focusing, zoom changing, focus changing, and auto exposure correction and provide the control signal to the optical driving unit 114 and an image pickup device controller 118, thereby controlling the overall operation of a shutter, a flash, etc., included in the digital photographing apparatus 100.

A user may input a control signal via the manipulating unit 180. The manipulating unit 180 may include various functional buttons, for example, a shutter release button for inputting a shutter release signal for photographing by exposing the image pickup device controller 118 to light for a predetermined period of time, a power button for inputting a control signal for controlling power supply, a wide angle-zoom button and a telescopic-zoom button for respectively extending and reducing an angle of view according to an input, a button for selecting one of various modes such as a text input mode, a photographing mode, or a reproducing mode, and a button for selecting any of various functions such as a white balance function or an exposure function. The manipulating unit 180 may be configured in any of various forms, for example, a button, a keyboard, a touch pad, a touch screen, or a remote control, through which a user may input a control signal.

Figure 3:
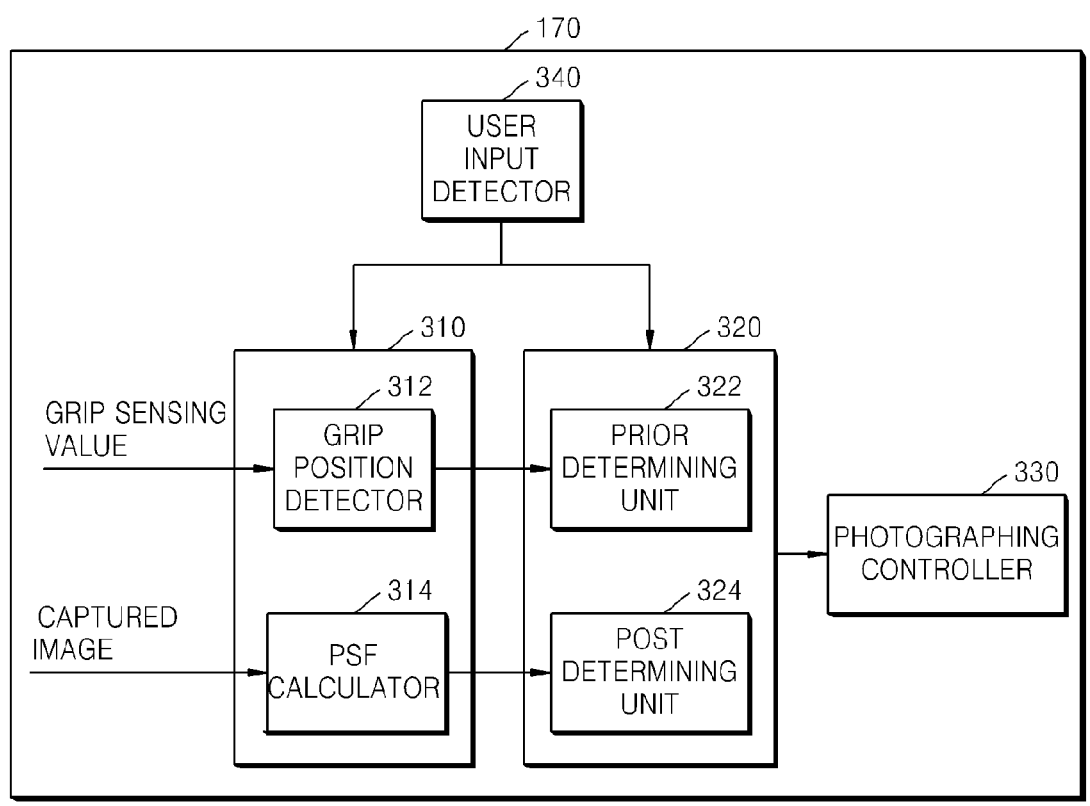
FIG. 3 is a block diagram illustrating a (central processing unit/digital signal processor) CPU/DSP, according to an embodiment of the invention.

FIG. 3 is a block diagram illustrating the CPU/DSP 170, according to an embodiment of the invention.

The CPU/DSP 170 may include a shaking information deriving unit 310 for deriving shaking information of the digital photographing apparatus 100, a base optical system determining unit 320 for determining a base optical system according to the shaking information, and a photographing controller 330 for controlling photographing according to the determination of the base optical system determining unit 320. In the current embodiment of the invention, the base optical system is determined according to shaking information, and the shaking information may be determined according to a where a user is gripping the digital photographing apparatus 100.

Via the base optical system, an image including key information from among images captured through the plurality of optical systems may be obtained. According to the current embodiment of the invention, a plurality of images may be obtained through the plurality of optical systems and then image processing may be performed thereon. In this case, photographing setting values of the plurality of images may be different according to the type of the image processing. However, an image having a specific photographing setting value may be a standard or may have key information according to the type of the image processing. In the current embodiment of the invention, the image having the specific photographing setting value may be captured through the base optical system.

Figure 4:
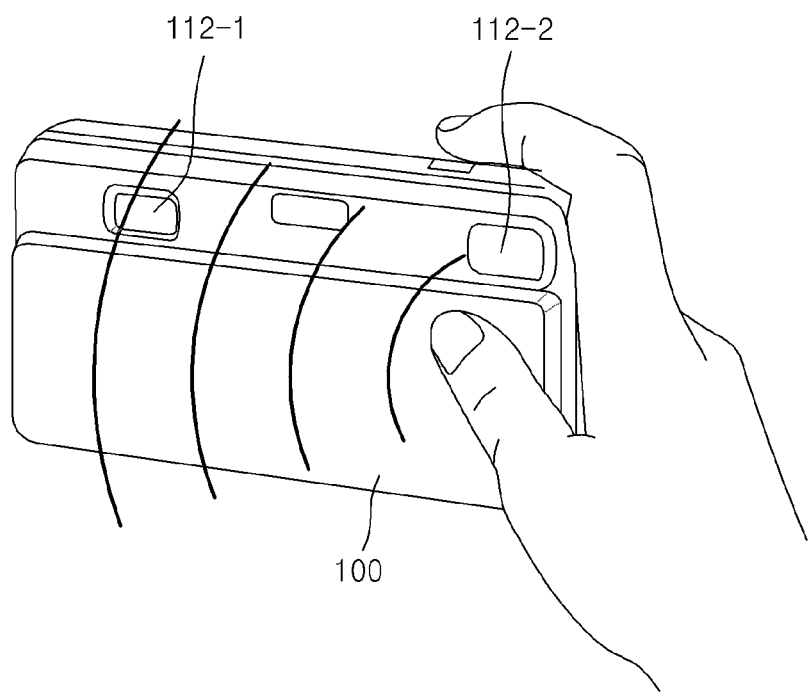
FIG. 4 illustrates a user gripping the digital photographing apparatus of FIG. 1.

FIG. 4 illustrates a user gripping the digital photographing apparatus 100. As illustrated in FIG. 4, when the user grips a part of the digital photographing apparatus 100 close to the second optical system 112-2, if the digital photographing apparatus 100 is shaken due to a user's hand-shake, the first optical system 112-1 is shaken more than the second optical system 112-2. Accordingly, there is a high possibility that more noticeable shaking is shown in an image captured through the first optical system 112-1 than in an image captured through the second optical system 112-2. In the current embodiment of the invention, from among the plurality of optical systems, an optical system that is less shaken is determined to be the base optical system, and an image captured through the base optical system is determined to be a base image, so that, when a result image is obtained by processing one of a plurality of images or when one of the plurality of images is selected as a result image, the result image is obtained having a high picture quality.

The shaking information deriving unit 310 may include a grip position detector 312, and the base optical system determining unit 320 may include a prior determining unit 322. In the current embodiment of the invention, the base optical system is determined according to the grip position before photographing, and then photographing is performed after photographing setting values of the plurality of optical systems are established.

The grip position detector 312 receives a grip sensing value for detecting the grip position, thereby determining the grip position. The grip sensing value may be any of various types of sensing values for detecting the grip position. For example, the digital photographing apparatus 100 may include a touch sensor (not shown) for detecting a user's grip on a housing thereof, wherein the grip sensing value may be output from the touch sensor. At this point, the grip position detector 312 may determine the grip position from the position from which touch is sensed. Alternatively, the digital photographing apparatus 100 may include an acceleration sensor near each of the first and second optical systems 112-1 and 112-2, wherein the grip sensing value may be output from each acceleration sensor. At this point, the grip position detector 312 may determine that a user is gripping near the optical system in which a large acceleration is detected in the adjacent acceleration sensor, from among the first and second optical systems 112-1 and 112-2.

The prior determining unit 322 determines the base optical system according to the grip position detected by the grip position detector 312 before photographing. For example, the prior determining unit 322 determines that the optical system closest to the grip position is the base optical system.

The photographing controller 330 determines a photographing setting value of each of the plurality of optical systems according to the determination of the base optical system determining unit 320 and controls photographing. At this point, the photographing controller 330 applies a control signal to the optical driving unit 114 and the image pickup device controller 118 so as to control photographing through the plurality of optical systems.

Figure 5:
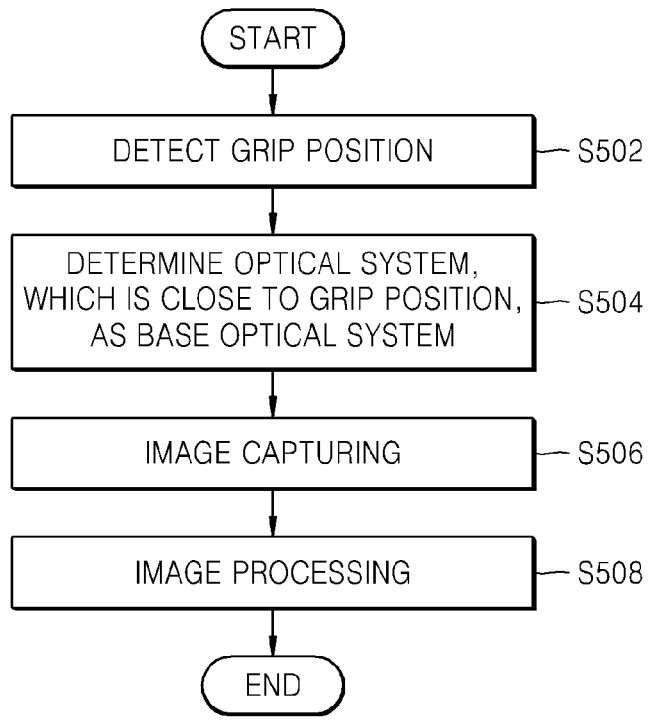
FIG. 5 is a flowchart of a method of controlling a digital photographing apparatus, according to an embodiment of the invention.

FIG. 5 is a flowchart of a method of controlling a digital photographing apparatus, according to an embodiment of the invention.

First, a grip position is detected by the grip position detector 312 before photographing (S502). The prior determining unit 322 determines that the optical system closest to the grip position is the base optical system (S504). After the base optical system is determined, image capturing is performed on an optical signal that is input through the plurality of optical systems automatically or in response to a user's shutter release input (S506). Image processing is performed on a plurality of images captured through the plurality of optical systems (S508). The image processing may include various processes, for example, shaking correction, point spread function (PSF) calculation, backlight correction, dynamic range processing, and three-dimensional image processing, and selection of a result image from among the plurality of images may be performed. Photographing setting values of the base optical system and a reference image optical system may be the same or different.

According to another embodiment of the invention, the shaking information deriving unit 310 may include a PSF calculator 314, and the base optical system determining unit 320 may include a post determining unit 324. After photographing is performed, shaking information is derived with respect to each of the plurality of optical systems according to PSFs, and the base optical system is determined according to the shaking information. Then, image processing may be performed based on the base optical system. Shake information may be determined by other methods such as those discussed above.

The PSF calculator 314 calculates a PSF of an image captured via each of the plurality of optical systems. The PSF is a function representing a path of shaking, and is used in Equation 1 below.

$$B = PSF \otimes L + N \quad (1)$$

wherein, B denotes an image in which blurring occurs, L denotes an image in which blurring does not occur, and N denotes white gaussian noise. That is, a blurred image is generated by convolution of the image L in which blurring does not occur with the PSF. The PSF may be represented as an image representing a path of shaking.

A method of estimating a PSF is classified into a method using a gyro sensor and a method using an image. In the method using a gyro sensor, a PSF is estimated by measuring an angular speed while an image is exposed and converting the measured angular speed value into amounts of movement in horizontal and vertical directions. In the method using an image, a PSF is calculated from an image by using various PSF calculation algorithms. For example, a PSF estimation method may be used as described in Korean Patent Application No. 2009-112785, the entire disclosure of which is incorporated herein by reference.

The post determining unit 324 checks the degree of shaking of each optical system by using the PSF with respect to each optical system calculated in the PSF calculator 314 and determines the base optical system according to the degree of shaking. At this point, the post determining unit 324 may determine that the optical system that is shaken the least is the base optical system. If the post determining unit 324 determines the base optical system, when image processing is performed with respect to captured images obtained by photographing, a base image may be directly selected according to the determination of the post determining unit 324. Alternatively, if the post determining unit 324 determines the base optical system for a current photographing session, the base optical system may be determined according to the determination of the post determining unit 324 for a next photographing session, and the base optical system may be updated by the post determining unit 324 whenever performing photographing.

Figure 6:
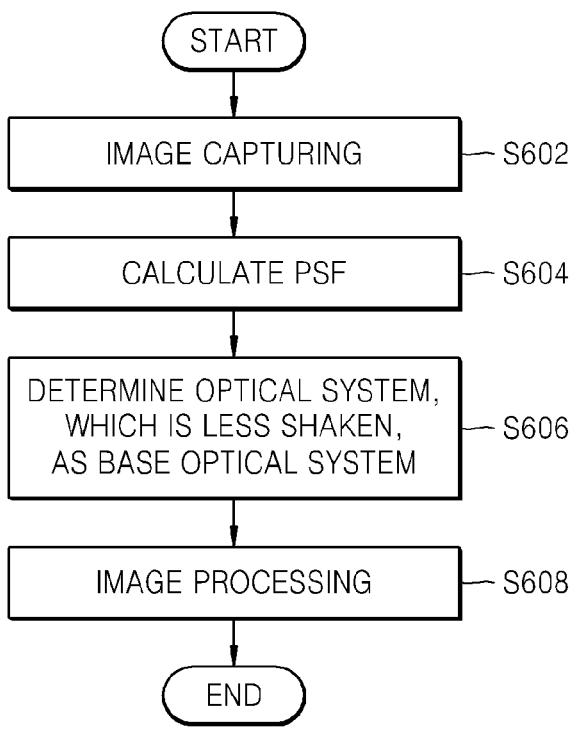
FIG. 6 is a flowchart of a method of controlling a digital photographing apparatus, according to another embodiment of the invention.

FIG. 6 is a flowchart of a method of controlling the digital photographing apparatus, according to another embodiment of the invention.

According to the embodiment, when images are captured through a plurality of optical systems (S602), a PSF is calculated from each of the plurality of images captured in the PSF calculator 314 (S604). Next, the post determining unit 324 determines that the optical system less shaken from among the plurality of optical systems is a base optical system, according to the PSFs calculated by the PSF calculator 314 (S606). Next, image processing is performed on the captured plurality of images (S608). At this point, the determination of the base optical system may be directly used when image processing is performed. Alternatively, the determination of the base optical system performed by the posterior determining unit 324 may be applied to the next photographing session.

According to the current embodiment of the invention, the CPU/DSP 170 includes the shaking information deriving unit 310, the base optical system determining unit 320, the photographing controller 330, and a user input detector 340. In the current embodiment of the invention, the base optical system is determined by using a prior determination method or a post determination method according to a user's selection.

The user input detector 340 detects a user's input for selecting a base optical system determination type. For example, the user input detector 340 may detect user's input that is input using the manipulating unit 180. The user may select any one of a prior determination type and a posterior determination type through a predetermined user interface. The user interface that may select a base optical system determination type may be modified to have any of various other forms.

According to the current embodiment, the shaking information deriving unit 310 includes the grip position detector 312 and the PSF calculator 314, and the base optical system determining unit 320 includes the prior determining unit 322 and the post determining unit 324. When a user selects the prior determination type, the shaking information deriving unit 310 sends shaking information from the grip position detector 312 to the base optical system determining unit 320, and the base optical system determining unit 320 determines the base optical system using the prior determining unit 322. When the user selects the post determination type, the shaking information deriving unit 310 sends shaking information from the PSF calculator 314 to the base optical system determining unit 320, and the base optical system determining unit 320 determines the base optical system using the post determining unit 324. Operations of the grip position detector 312, the PSF calculator 314, the prior determining unit 322, and the post determining unit 324 are similar to those described above.

Figure 7:
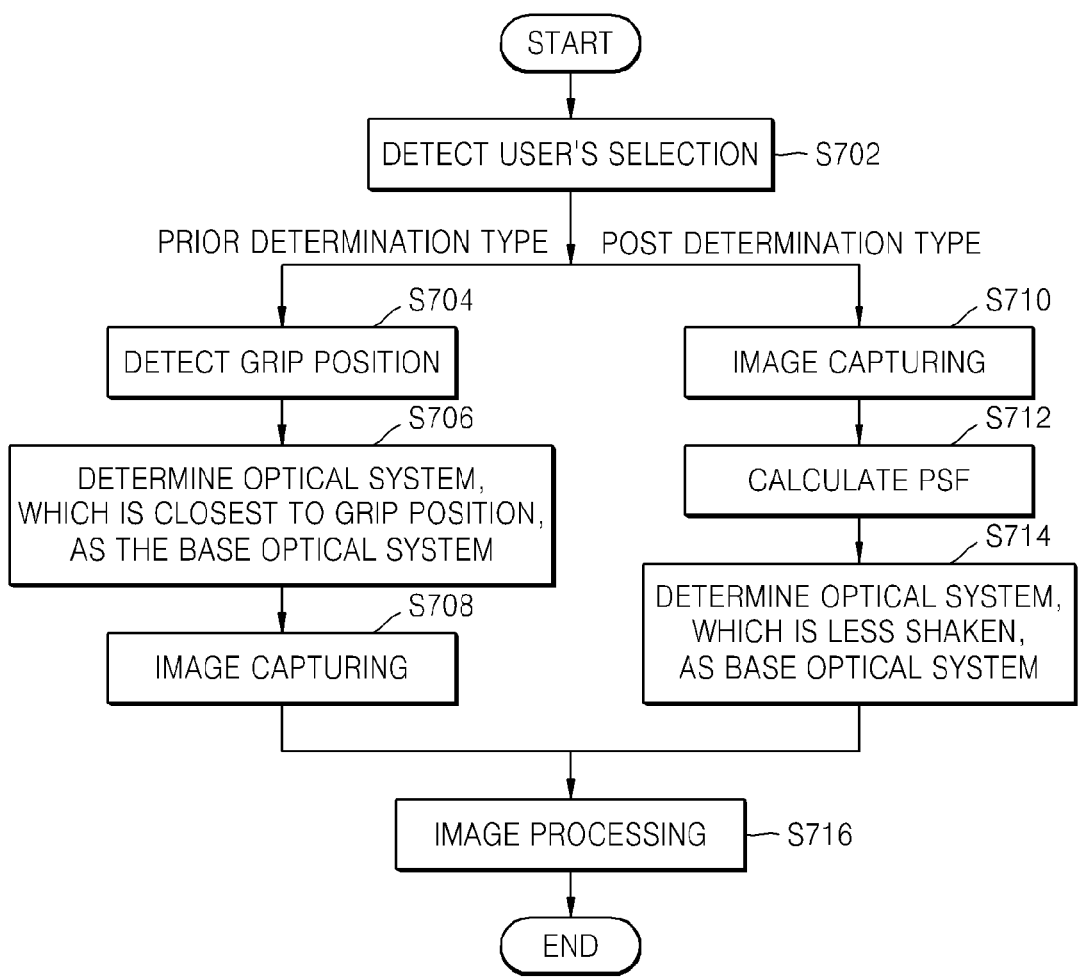
FIG. 7 is a flowchart of a method of controlling a digital photographing apparatus, according to another embodiment of the invention.

FIG. 7 is a flowchart of a method of controlling a digital photographing apparatus, according to another embodiment of the invention.

When a user's selection for selecting a base optical system determination type is detected through the manipulating unit 180 (S702), the base optical system determination type is determined according to the user's selection.

When a user selects a prior determination type, the grip position detector 312 detects a grip position (S704), and the prior determining unit 322 determines an optical system that is closest to the grip position, from among a plurality of optical systems, as the base optical system (S706). When the base optical system is determined (S706), the photographing controller 330 determines and controls photographing setting values of the plurality of optical systems, and then performs photographing (S708).

When a user selects a post determination type, after photographing using the plurality of optical systems is performed (S710), the PSF calculator 314 calculates a PSF from each of a plurality of images captured through the optical systems (S712). After the PSFs are calculated, the post determining unit 324 determines that an optical system that is least shaken, from among the plurality of optical systems, is the base optical system, based on the PSFs (S714).

When the base optical system is determined, image processing is performed on the captured images (S716).

In the prior determination type, since the base optical system is determined before photographing, a rapid calculation is possible after photographing, but a response time at a photographing moment may be slightly increased. On the other hand, in the post determination type, response at the photographing moment is rapid, but the amount of an additional calculation after photographing may be increased. According to the current embodiment of the invention, since a user selects the base optical system determination type according to a photographing situation or a desired image processing type, the user may actively respond to each situation.

Alternatively, the user may automatically select the prior determination type or the posterior determination type according to the type of image processing to be performed after photographing.

Figure 8:
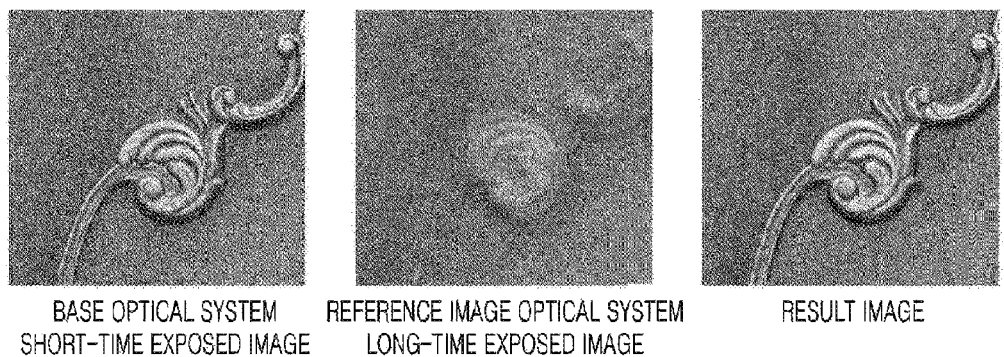
FIG. 8 illustrates captured images and a result image when hand-shake correction is performed with respect to the captured images in a digital photographing apparatus that is affected by hand-shake, according to an embodiment of the invention.

FIG. 8 illustrates captured images and a result image when hand-shake correction is performed with respect to the captured images in a digital photographing apparatus that is affected by hand-shake, according to an embodiment of the invention.

When the digital photographing apparatus 100 is as a compact camera that is affected by hand-shake, when a short-time exposed image and a long-time exposed image are captured by using a plurality of optical systems and when hand-shake of a captured image is corrected by using the short-time exposed image and the long-time exposed image, the short-time exposed image, which is not shaken, needs to be obtained in order to obtain proper boundary information. Accordingly, in the digital photographing apparatus 100 affected by hand-shake, the photographing controller 330 controls the plurality of optical systems to capture the short-time exposed image in a base optical system and to capture the long-time exposed image in a reference image optical system. In this case, a result image of which shaking is corrected may be obtained as illustrated in FIG. 8.

Figure 9:
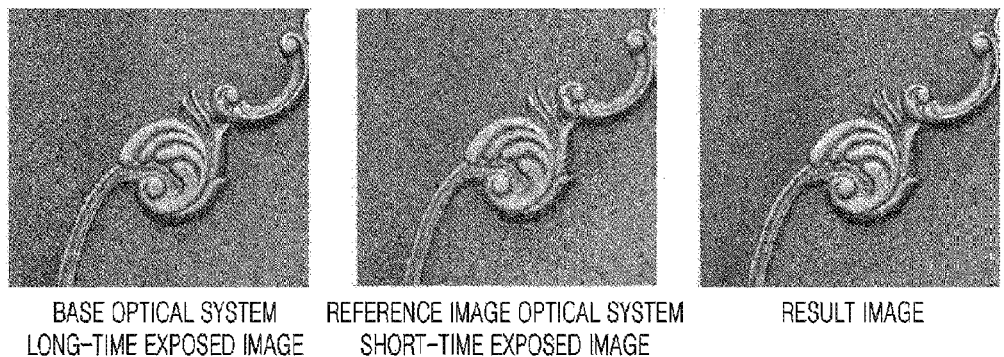
FIG. 9 illustrates captured images and a result image when hand-shake correction is performed with respect to the captured images in a digital photographing apparatus that is not affected by hand-shake, according to an embodiment of the invention.

FIG. 9 illustrates captured images and a result image when hand-shake correction is performed on the captured images in a digital photographing apparatus that is not affected by hand-shake, according to an embodiment of the invention.

When the digital photographing apparatus 100 is not affected by hand-shake or is not significantly affected by hand-shake, such as a digital single-lens reflex camera (DSLR) camera having high specifications, when a short-time exposed image and a long-time exposed image are captured by using a plurality of optical systems and when hand-shake of a captured image is corrected by using the short-time exposed image and the long-time exposed image, an image that is not shaken needs to be obtained from the long-time exposed image having a large amount of input data in order to obtain a result image of which shaking is corrected and which has a high picture quality. Accordingly, when the digital photographing apparatus 100 is not affected by hand-shake or not significantly affected by hand-shake, the photographing controller 330 controls the plurality of optical systems to capture the long-time exposed image in a base optical system and to capture the short-time exposed image in a reference image optical system. In this case, the result image of which shaking is corrected may be obtained as illustrated in FIG. 9.

Image processing for correcting hand-shake may be performed using any of various methods. For example, methods described in Korean Patent Applications No. 2009-115192 and No. 2009-131802 may be used. The Korean Patent Applications No. 2009-115192 and No. 2009-131802 the entire content of both are hereby included by reference.

Figure 10:
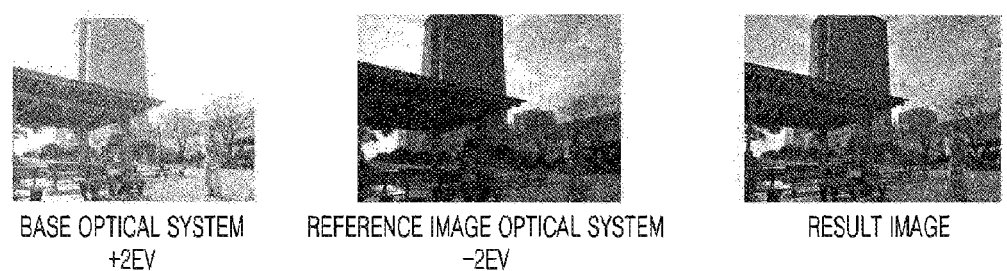
FIG. 10 illustrates captured images and a result image obtained by correcting backlight when backlight correction is performed by using a plurality of images captured through a plurality of optical systems, according to an embodiment of the invention.

FIG. 10 illustrates captured images and a result image obtained by correcting backlight when backlight correction is performed by using a plurality of images captured through a plurality of optical systems, according to an embodiment of the invention.

According to the current embodiment of the invention, when backlight correction is performed using a plurality of images captured through a plurality of optical systems, an exposure value is established to be large in a base optical system, and an exposure value is established to be small in a reference image optical system, thereby correcting backlight. At this point, an image that has a large amount of input data and has a large exposure value is captured through the base optical system, thereby obtaining an image having a high picture quality.

According to the current embodiment of the invention, when a wide angle image and a telescopic image are captured at the same time by using a plurality of optical systems, the telescopic image may be captured in a base optical system, and the wide angle image may be captured in a reference image optical system. When the wide angle image is captured in any one of the plurality of optical systems, and when the telescopic image is captured in the other one of the plurality of optical systems, zooming steps of the two the optical systems are established in different ways. However, when the captured image is zoomed in on, the captured image is easily affected by hand-shake. When the wide angle image is captured in the base optical system and when the telescopic image is captured in the reference image optical system, the telescopic image easily affected by hand-shake is captured in the reference image optical system, which may be greatly shaken, and thus the picture quality of the telescopic image is reduced due to the hand-shake. However, as in the current embodiment, when the telescopic image is captured in the base optical system and when the wide angle image is captured in the reference image optical system, the wide angle image and the telescopic image that have an appropriate picture quality may be captured at the same time.

When images having the same angle of view are captured in the plurality of optical systems, and when a telescopic image is extracted using a predetermined method from the captured images after photographing, the telescopic image may be extracted from the image captured in the base optical system.

According to an embodiment of the invention, a three-dimensional image may be composited by using the images captured through the plurality of optical systems. At this time, in order to obtain a depth map for obtaining the three-dimensional image, when an image, to which an infrared filter is not applied, and an image, to which an infrared filter is applied, are captured, the photographing controller 330, for example, may capture the image, to which the infrared filter is not applied, in the base optical system and may capture the image, to which the infrared filter is applied, in the reference image optical system in order to capture an image having a large amount of information in the base optical system. Alternatively, the photographing controller 330 may capture the image, to which the infrared filter is applied, in the base optical system, and may capture the image, to which infrared rays are not applied, in the reference image optical system in order to capture an image having a small amount of received light in the base optical system.

Also, when a three-dimensional image is obtained using images captured through the plurality of optical systems, the photographing controller 330 may capture an image, which is exposed for a short time, in the base optical system and capture an image, which is exposed for a long time, in the reference image optical system.

If any one of the images captured in the plurality of optical systems is selected as a result image, the image captured in the base optical system may be selected as the result image. In this case, the CPU/DSP 170 may further include a result image obtaining unit (not shown) that selects the image captured in the base optical system as the result image. The reference image may be used to improve the image quality of the base image.

According to embodiments of the invention, in a digital photographing apparatus including a plurality of optical systems, a base optical system can be effectively determined so as to obtain a result image having a high picture quality.

The various illustrative logics, logical blocks, modules, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The functionality associated with describing embodiments of the invention is described with a number of illustrative units. The units may be differently arranged so that the functionality of a single unit may be implemented with two or more units and the functionality of two or more units may be combined into a single unit.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium. The machine readable medium may be limited to physical medium or to non-transitory medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of controlling a digital photographing apparatus comprising a plurality of optical systems, the method comprising:
   deriving shake information from each of the plurality of optical systems;
   detecting a user's input for selecting a base optical system determination type; and
   selecting a base optical system from among the plurality of optical systems according to the shake information;
   wherein the step of selecting a base optical system further comprises determining that an optical system least shaken from among the plurality of optical systems is the base optical system;
   wherein the shake information is a user's grip position for the digital photographing apparatus;
   wherein the step of deriving shake information comprises detecting the user's grip position, and the step of selecting the base optical system further comprises determining that an optical system closest to the user's grip position is the base optical system;
   wherein if the user's input indicates a prior determination type, the steps of deriving the shake information and selecting the base optical system are performed before capturing an image, and the step of deriving of the shake information further comprises detecting the user's grip position, and the step of selecting of the base optical system further comprises determining that an optical system closest to the user's grip position is the base optical system, and wherein if the user's input indicates a post determination type, the steps of deriving of the shake information and the determining of the base optical system are performed after capturing an image, and the step of deriving of the shaking information further comprises calculating PSFs from the plurality of images captured via the plurality of optical systems, and the step of selecting the base optical system further comprises determining that an optical system least shaken from among the plurality of optical systems is the base optical system based on the calculated PSFs.

2. The method of claim 1, wherein the steps of deriving shake information and the step of selecting a base optical system are performed before capturing an image.

3. The method of claim 1, wherein the step of deriving shake information further comprises calculating point spread functions (PSFs) from a plurality of images captured via the plurality of optical systems, and the step of selecting a base optical system further comprises selecting a base optical system from among the plurality of optical systems according to the shake information based on the calculated PSFs.

4. The method of claim 1, wherein the method of controlling the digital photographing apparatus further comprises:
if a plurality of images comprises at least one short-time exposed image and at least one long-time exposed image and if the derived shake information indicates the digital photographing apparatus is affected by hand-shake,
controlling capturing of the at least one short-time exposed image in the base optical system and capturing of the at least one long-time exposed image in a reference optical system of the plurality of optical systems.

5. The method of claim 1, wherein the method of controlling the digital photographing apparatus further comprises:
if a plurality of images comprises at least one short-time exposed image and at least one long-time exposed image and if the derived shake information indicates the digital photographing apparatus is not affected by hand-shake,
controlling capturing of the at least one long-time exposed image in the base optical system and capturing of the at least one short-time exposed image in a reference optical system of the plurality of optical systems.

6. The method of claim 1, wherein the method of controlling the digital photographing apparatus further comprises:
if the plurality of images comprises at least one image having a small exposure value and at least one image having a large exposure value, and if a plurality of images for correcting backlight are captured through the plurality of optical systems,
controlling capturing of the at least one image having a large exposure value in the base optical system and controlling capturing of the at least one image having a small exposure value in a reference optical system of the plurality of optical systems.

7. The method of claim 1, wherein the method of controlling the digital photographing apparatus further comprises:
if at least one wide angle image and at least one telescopic image are captured through the plurality of optical systems,
controlling capturing of the at least one telescopic image in the base optical system and controlling capturing of the at least one wide angle image in a reference optical system of the plurality of optical systems.

8. The method of claim 1, wherein the method of controlling the digital photographing apparatus further comprises:
if a plurality of images for obtaining a three-dimensional image are captured through the plurality of optical systems,
controlling capturing of an image having a short exposure time in the base optical system.

9. The method of claim 1, wherein the method of controlling the digital photographing apparatus further comprises:
if a plurality of images for obtaining a three-dimensional image are captured through the plurality of optical systems,
controlling capturing of an image having a large amount of input data in the base optical system.

10. The method of claim 1, further comprising selecting an image captured in the base optical system as a result image.

11. A digital photographing apparatus comprising:
a plurality of optical systems;
at least one image pickup device configured to convert light that has passed through the plurality of optical systems into an electrical signal;
a shake information deriving unit configured to derive shake information from each of the plurality of optical systems; and
a base optical system determining unit configured to select a base optical system from among the plurality of optical systems according to the shake information,
a user input detector configured to detect a user's input for selecting a base optical system determination type; a grip position detector configured to detect the user's grip position before capturing an image; a PSF calculator configured to calculate a PSFs from a plurality of images captured via the plurality of optical systems, wherein the shake information deriving unit is further configured to derive shake information based on the calculated PSF's; a prior determining unit configured to determine that an optical system closest to the detected grip position is the base optical system before capturing an image if the user's input indicates a prior determination type; and a post determining unit configured to determine that an optical system least shaken based on the derived shake information from among the plurality of optical systems is the base optical system if the user's input indicates a post determination type,
wherein the base optical system determining unit is configured to determine that an optical system least shaken from among the plurality of optical systems is the base optical system;
wherein the shake information is a user's grip position for the digital photographing apparatus;
wherein the shaking information deriving unit comprises a grip position detector configured to detect the user's grip position, and the base optical system determining unit comprises a prior determining unit configured to determine that an optical system closest to the user's grip position is the base optical system.

12. The digital photographing apparatus of claim 11, wherein the grip position detector is further configured to detect the user's grip position before capturing an image, and the prior determining unit is further configured to select the base optical system before capturing an image.

13. The digital photographing apparatus of claim 11, wherein the shake information deriving unit is further configured to derive shake information based on a PSF calculator configured to calculate PSFs from the plurality of images captured via the plurality of optical systems, and the base optical system determining unit is further configured to determine based on the shake information that an optical system less shaken from among the plurality of optical systems is the base optical system.

14. The digital photographing apparatus of claim 11, the digital photographing apparatus further comprising:
a photographing controller configured to control capturing of at least one short-time exposed image in the base optical system and at least one long-time exposed image in a reference optical system of the plurality of optical systems if a plurality of images captured through the plurality of optical systems comprises at least one short-time exposed image and at least one long-time exposed image, and if the shake information indicates the digital photographing apparatus is affected by hand-shake.

15. The digital photographing apparatus of claim 11, the digital photographing apparatus further comprises:

a photographing controller configured to control capturing of at least one long-time exposed image and at least one long-time exposed image in a reference optical system of the plurality of optical systems if a plurality of images captured through the plurality of optical systems are for correcting shaking, and if the plurality of images comprises at least one short-time exposed image and at least one long-time exposed image, and if the digital photographing apparatus is not affected by hand-shake.

16. The digital photographing apparatus of claim 11, wherein the digital photographing apparatus further comprises:
a photographing controller configured to control capturing of at least one image having a large exposure value in the base optical system and at least one image having a small exposure value in a reference optical system of the plurality of optical systems, if a plurality of images captured through the plurality of optical systems are images for correcting backlight, and if the plurality of images comprises at least one image having a small exposure value and at least one image having a large exposure value.

17. The digital photographing apparatus of claim 11, wherein the digital photographing apparatus further comprises:
a photographing controller configured to control capturing of at least one telescopic image in the base optical system and at least one wide angle image in a reference optical system of the plurality of optical systems, if at least one wide angle image and at least one telescopic image are captured through the plurality of optical systems.

18. The digital photographing apparatus of claim 11, wherein the digital photographing apparatus further comprises:
a photographing controller configured to control capturing of an image having a short exposure time in the base optical system and an image having a long exposure time in a reference optical system of the plurality of optical systems if a plurality of images for obtaining a three-dimensional image are captured through the plurality of optical systems.

19. The digital photographing apparatus of claim 11, wherein the digital photographing apparatus further comprises:
a photographing controller configured to control capturing of an image having a large amount of input data in the base optical system if a plurality of images for obtaining a three-dimensional image are captured through the plurality of optical systems.

20. The digital photographing apparatus of claim 11, further comprising a result image obtaining unit configured to select an image captured in the base optical system as a result image.

21. The digital photographing apparatus of claim 11, further comprising:
a plurality of acceleration sensors that corresponds to the plurality of optical systems;
wherein each acceleration sensor of the plurality of acceleration sensors is located near each corresponding optical system of the plurality of optical systems and outputs a grip sensing value for determination of the user's grip position.

22. A non-transitory computer-readable storage medium having embodied thereon a computer program for controlling a digital photographing apparatus comprising a plurality of optical systems, the computer program comprising:
a code portion for causing a computer to derive shake information from each of the plurality of optical systems; a code portion for causing the computer to detect a user's input for selecting a base optical system determination type; and
a code portion for causing the computer to select a base optical system from among the plurality of optical systems according to the shaking information,
wherein the code portion for causing the computer to select a base optical system further comprises determining that an optical system least shaken from among the plurality of optical systems is the base optical system;
wherein the shake information is a user's grip position for the digital photographing apparatus;
wherein the code portion for causing the computer to derive shake information further comprises a code portion for causing the computer to detect the user's grip position, and the code portion for causing the computer to select the base optical system further comprises a code portion for causing the computer to determine that an optical system closest to the user's grip position is the base optical system
wherein if the user's input indicates a prior determination type, the steps of deriving the shake information and selecting the base optical system are performed before capturing an image, and the step of deriving of the shake information further comprises detecting the user's grip position, and the step of selecting of the base optical system further comprises determining that an optical system closest to the user's grip position is the base optical system, and wherein if the user's input indicates a post determination type, the steps of deriving of the shake information and the determining of the base optical system are performed after capturing an image, and the step of deriving of the shaking information further comprises calculating PSFs from the plurality of images captured via the plurality of optical systems, and the step of selecting the base optical system further comprises determining that an optical system least shaken from among the plurality of optical systems is the base optical system based on the calculated PSFs.

* * * * *